United States Patent
Weirauch

(10) Patent No.: US 7,804,752 B2
(45) Date of Patent: Sep. 28, 2010

(54) FOCAL OFFSET RECORDING SYSTEM AND METHOD

(75) Inventor: Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 906 days.

(21) Appl. No.: 11/702,265

(22) Filed: Feb. 5, 2007

(65) Prior Publication Data

US 2008/0186828 A1 Aug. 7, 2008

(51) Int. Cl.
*G11B 11/00* (2006.01)

(52) U.S. Cl. .............. 369/53.28; 369/53.37; 369/275.4

(58) Field of Classification Search ................ None
See application file for complete search history.

(56) References Cited

U.S. PATENT DOCUMENTS

| | | | |
|---|---|---|---|
| 5,541,900 A | 7/1996 | Ito et al. | |
| 5,701,288 A | 12/1997 | Seong | |
| 5,802,029 A | 9/1998 | Zucker | |
| 5,923,626 A | 7/1999 | Richter | |
| 6,034,936 A | 3/2000 | Ogawa et al. | |
| 6,198,706 B1 | 3/2001 | Zucker | |
| 6,359,845 B1 | 3/2002 | Lee et al. | |
| 7,292,517 B2 | 11/2007 | Hendriks et al. | |
| 7,301,881 B2 * | 11/2007 | Itonaga | 369/112.23 |
| 2002/0176342 A1 * | 11/2002 | Worthington et al. | 369/53.31 |
| 2005/0007926 A1 | 1/2005 | Weirauch | |
| 2005/0157628 A1 | 7/2005 | Wilkinson et al. | |
| 2006/0140070 A1 | 6/2006 | Shiono et al. | |
| 2006/0146663 A1 | 7/2006 | Van Brocklin et al. | |
| 2006/0233075 A1 * | 10/2006 | Yeh et al. | 369/47.53 |

FOREIGN PATENT DOCUMENTS

| | | |
|---|---|---|
| EP | 0187664 | 7/1986 |
| EP | 1933313 | 6/2008 |
| JP | 2002-056550 A | 2/2002 |
| WO | 2005017886 | 2/2005 |

OTHER PUBLICATIONS

PCT International Search Report for Patent Application No. PCT/US2008/052889 (filed Feb. 4, 2008) Report issued Jul. 30, 2008.

* cited by examiner

*Primary Examiner*—Paul Huber

(57) ABSTRACT

The present invention is embodied in a recording device and media for storing computer readable data on a removable storage medium that includes using a first wavelength to write data to the removable storage medium and creating marks while writing the data that have predetermined wide spot sizes so that the marks can be read with a second wavelength, different from the first wavelength, of another computer readable storage device.

26 Claims, 12 Drawing Sheets

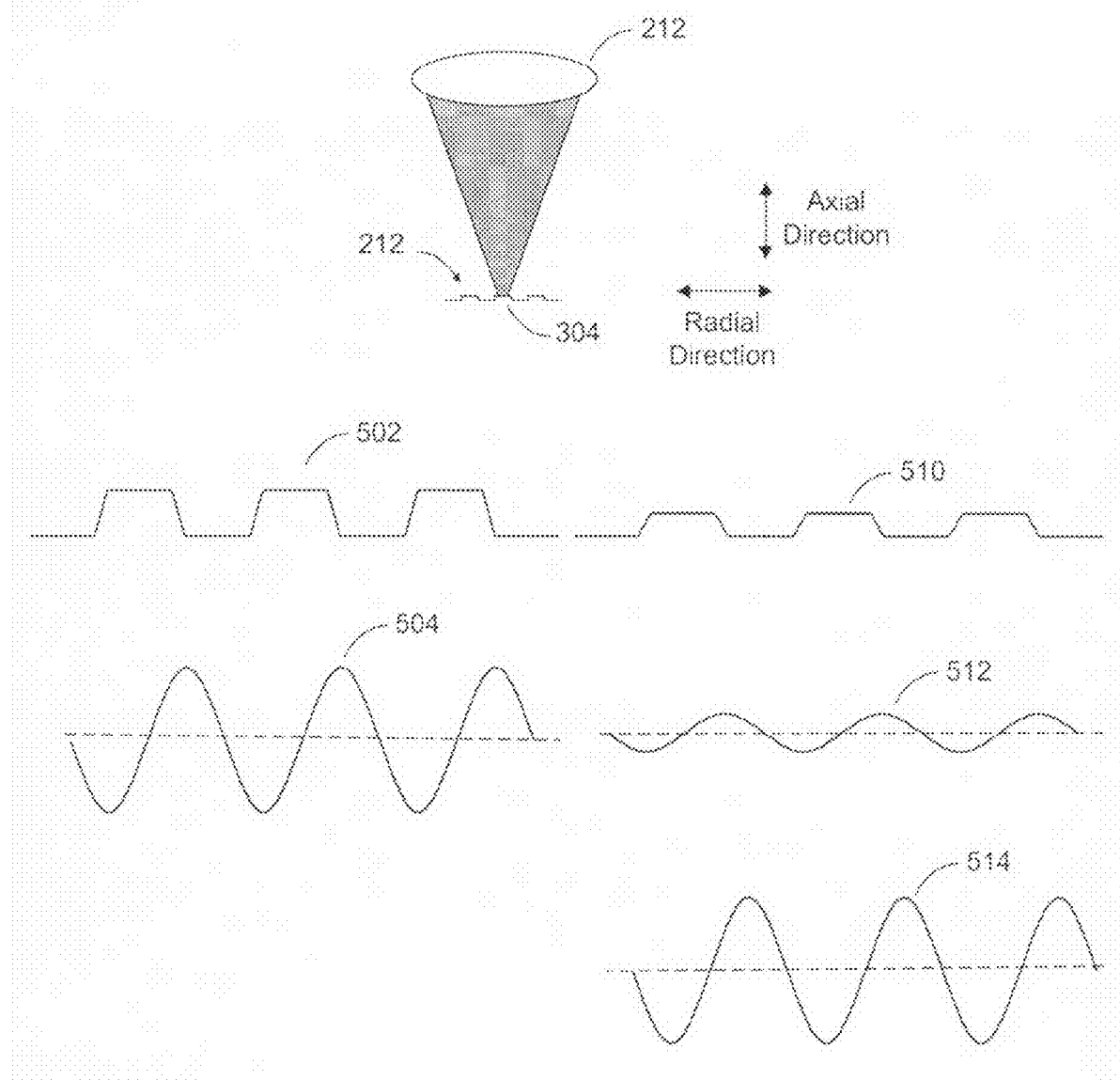

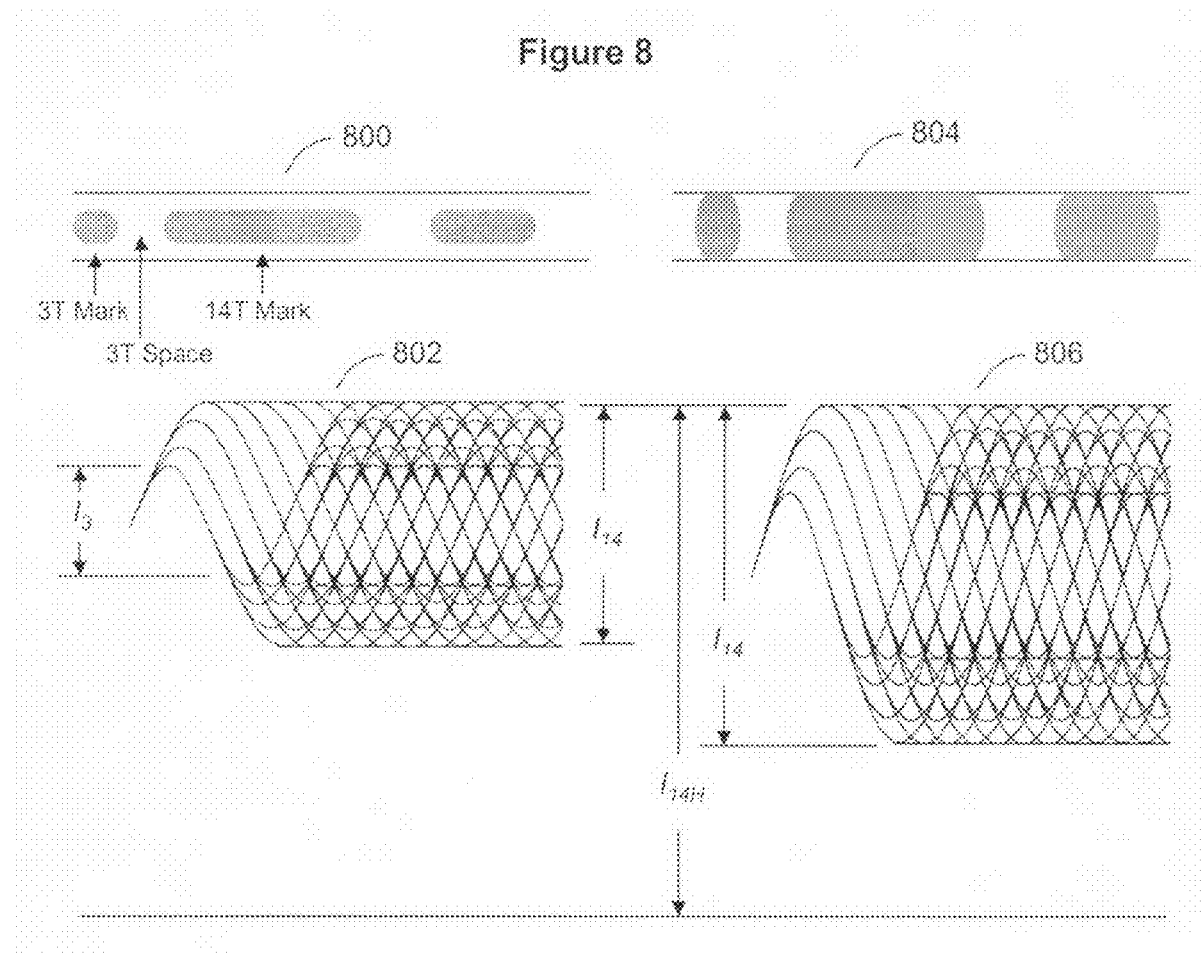

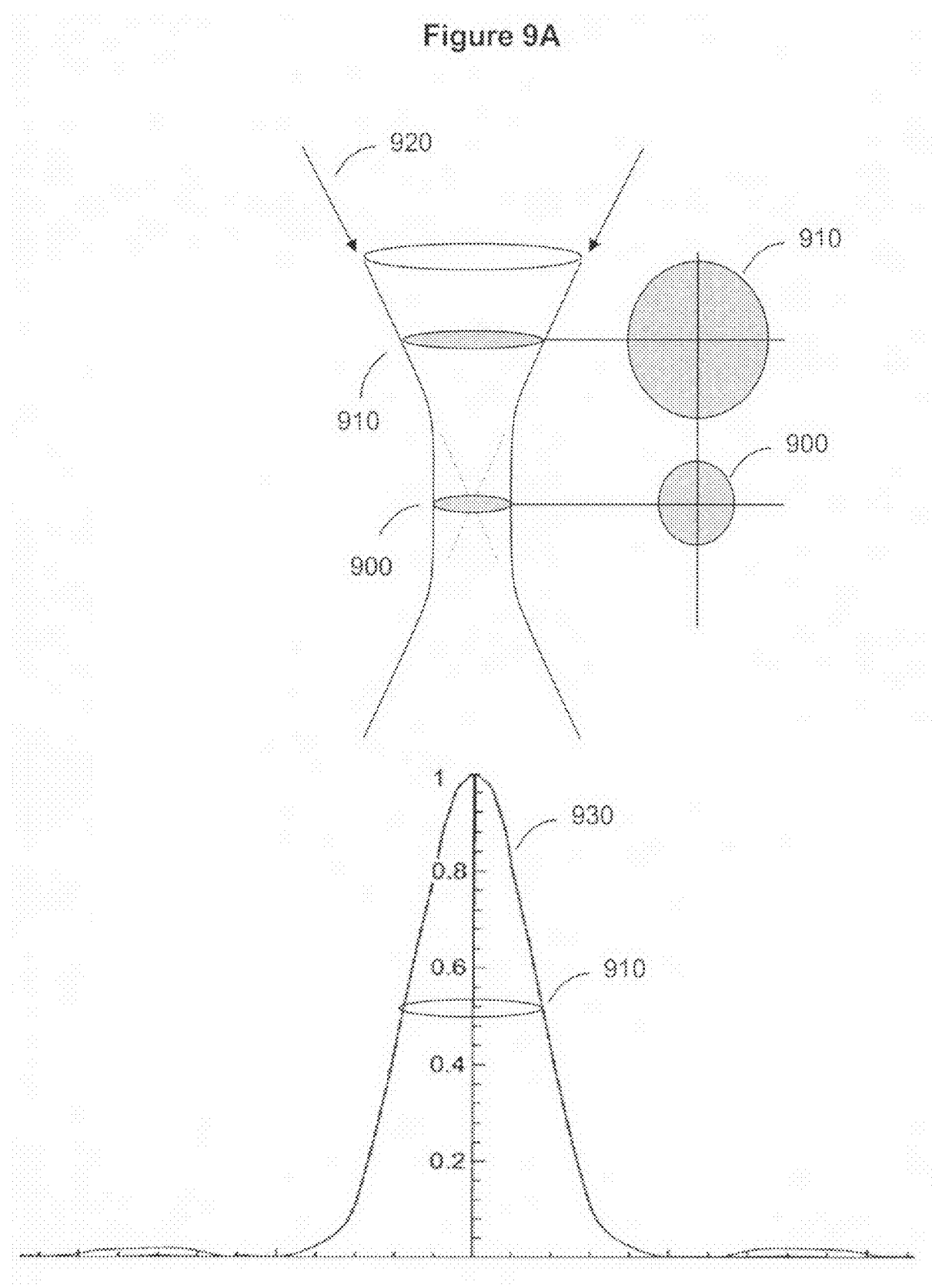

FOCAL OFFSET RECORDING SYSTEM AND METHOD

BACKGROUND

Some electronic systems include a storage drive that can write and read data on a removable storage medium. Because the storage medium is removable, the data on the storage medium is designed to be compatible with many other types of storage drives. It is desirable to have data that is written on one storage drive be readable by other storage drives. In addition, with copy protected removable storage media, once the media has been recorded, it is desirable to have drives other than those intended to write to the media capable of recognizing the media as read only. Unfortunately, since some of the storage drives intended for reading the media are also capable of writing on recordable media, the storage media may be rejected if it is recognized as copy protected recordable media.

SUMMARY

The present invention is embodied in a recording device for storing computer readable data on a removable storage medium that includes using a first wavelength to write data to the removable storage medium and creating marks while writing the data that have predetermined wide spot sizes so that the marks can be read with a second wavelength, different from the first wavelength, of another computer readable storage device.

BRIEF DESCRIPTION OF THE DRAWINGS

The present invention can be further understood by reference to the following description and attached drawings that illustrate the embodiment(s). Other features and advantages will be apparent from the following detailed description of the embodiment(s), taken in conjunction with the accompanying drawings, which illustrate, by way of example, the principles of the invention.

FIG. 5 shows a cross section portion of one embodiment of a storage medium and the push-pull signals in which the groove depths are optimized for reading and writing with a longer wavelength and with a shorter wavelength.

FIGS. 8 illustrates one embodiment of the signals from the various size recorded marks and spaces with recorded with two different recording spot sizes;

FIG. 9A depicts the intensity profile of one embodiment of the defocused spot compared against the optimal focused spot.

DETAILED DESCRIPTION OF THE EMBODIMENTS

In the following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Figure 1:
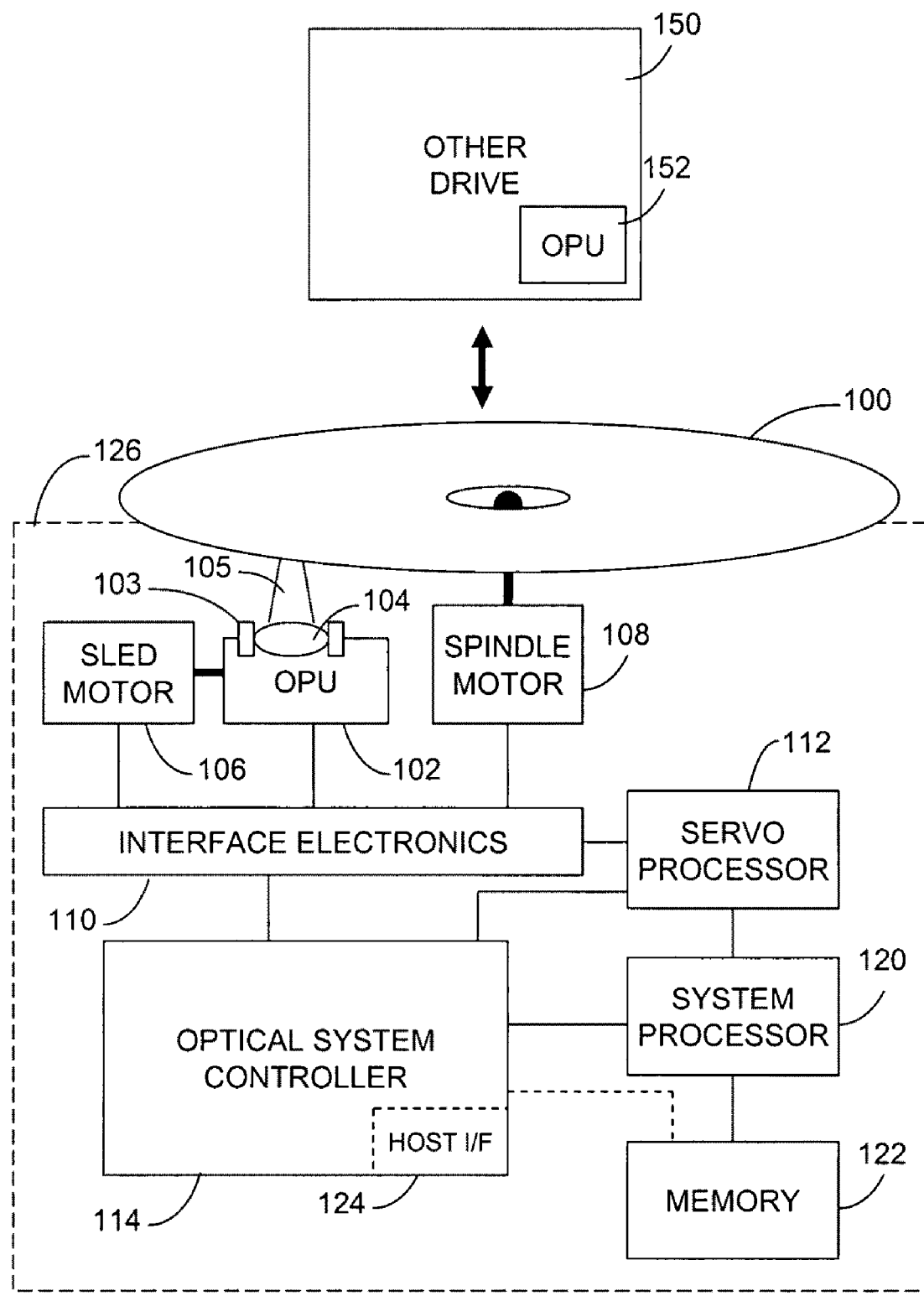
FIG. 1 is a block diagram of one embodiment of a drive mechanism capable of reading and/or recording on optical medium.

FIG. 1 is a block diagram of one embodiment of a drive mechanism capable of reading and/or recording on optical medium. In one embodiment, the system includes a removable optical disc 100 and a drive 126. Drive 126 further includes a spindle motor 108 connected to a clamping system for the removable optical disc 100. Information is read from and/or written on the disc 100 using an optical pickup unit (OPU 102).

The OPU 102 includes one or more lenses 104 and other optical elements as well as one or more laser diodes and photo-detectors. Additionally, OPU 102 includes electromechanical elements 103 to move an objective lens 104 in the radial and axial directions for keeping a laser beam 105 focused on following a track on optical disc 100. OPU 102 is mechanically attached to a sled motor 106, which is configured to move OPU 102 across a usable radius of the optical disc 100.

Interface electronics 110 are used to condition and combine signals from the photo-detectors in OPU 102 to create radial and focal signals for reading and writing and for creating a signal for reading data. Additionally, the interface electronics 110 control a laser diode in the OPU 102 during reading and writing. The interface electronics 110 also condition signals for the sled motor 106 and the spindle motor 108. Next, a servo processor 112 includes focus and tracking signals to adjust the lens 104 by the electro-mechanical elements 103 in OPU 102. The focusing and tracking by the servo processor 112 can be done directly or using the interface electronics 110 to maintain radial and axial tracking during reading and writing. The focusing and tracking can also be used to control the velocity of the spindle motor 108 while writing.

Drive 126 uses laser optics with a first wavelength to record data onto the disc 100. A small amount of focus offset is used to write the data at lower densities. For instance, a blue laser, which is intended to write data at densities above DVD densities, can be used to write data to the disc 100. In this case, the drive 126 would seek to a point some distance prior to the intended recording position using a nominal focus. A focus offset is then introduced to move the objective lens to a new focus position, which is maintained by the servo processing 110 functions. The servo processing 110 functions are configured to keep the objectives lens through the interface electronics at the same relative position from the disc surface.

In particular, an optical system disc controller 114 decodes data from the photo-detectors in OPU 102 and conditioned by interface electronics 110. Optical disc controller 114 also encodes data and modulates the laser power in OPU 102 through interface electronics 110. The optical disc controller 114 uses the read data to adjust the spindle motor 108 velocity if the servo processor 110 does not perform that function. In addition, the optical disc controller 114 includes a host interface 124 for communicating with a host device. Host interface 124 may be a proprietary interface, or may be an industry-standard interface, such as a Serial Advanced Technology Attachment (SATA) interface, a Parallel Advanced Technology Attachment (PATA) interface (sometimes embodied as an "IDE" or "EIDE" interface), a Universal Serial Bus (USB) interface, an IEEE 1394 serial interface, an IEEE 1284 parallel interface, or another kind of standard interface. The components in the system are controlled by a processor 120 running code from memory 122.

This allows drive 126 to be configured to enable other drive 150 with different laser optics to read data written to disc 100 by drive 126. For example, drive 150 includes an OPU unit 152 that uses a second wavelength that is different than the first wavelength used by drive 126. The first wavelength of drive 126 can be created with a blue-violet laser that has a wavelength of one of from 400 to 420 nanometers and the second wavelength of drive 150 can be created with a red laser that has a wavelength of one of from 645 to 670 nanometers. Drive 126 creates marks on disc 100 with predetermined wide spot sizes with the first wavelength so that the marks can be read with the second wavelength of drive 150.

Specifically, in one embodiment, discs are recorded using a blue-violet laser (for example, 405 nm) with a 0.65 numerical aperture (NA) lens that creates marks comparable to those written by a red laser (for example, 660 nm) with a 0.65 NA lens. The first wavelength enables a groove depth that has a low push-pull signal when read by a red laser, but a strong push-pull signal when read by a blue laser. As such, when drives with a red laser examine the push-pull signal, a weak push-pull signal will be exhibited. This allows the drives with the red lasers to read the disc since the weak push-pull signal will be similar or lower in amplitude to the push-pull signal that would be exhibited by the lands and pits of a stamped, read-only disc.

The system of FIG. 1 is one example of an optical disc system in accordance with one embodiment of the invention, but other embodiments are possible. The functions described may be partitioned into different blocks. For example, the servo processor 112 may be combined into optical system controller 114, or the system processor 120 and memory 122 can be combined into a single integrated circuit.

Figure 2A:
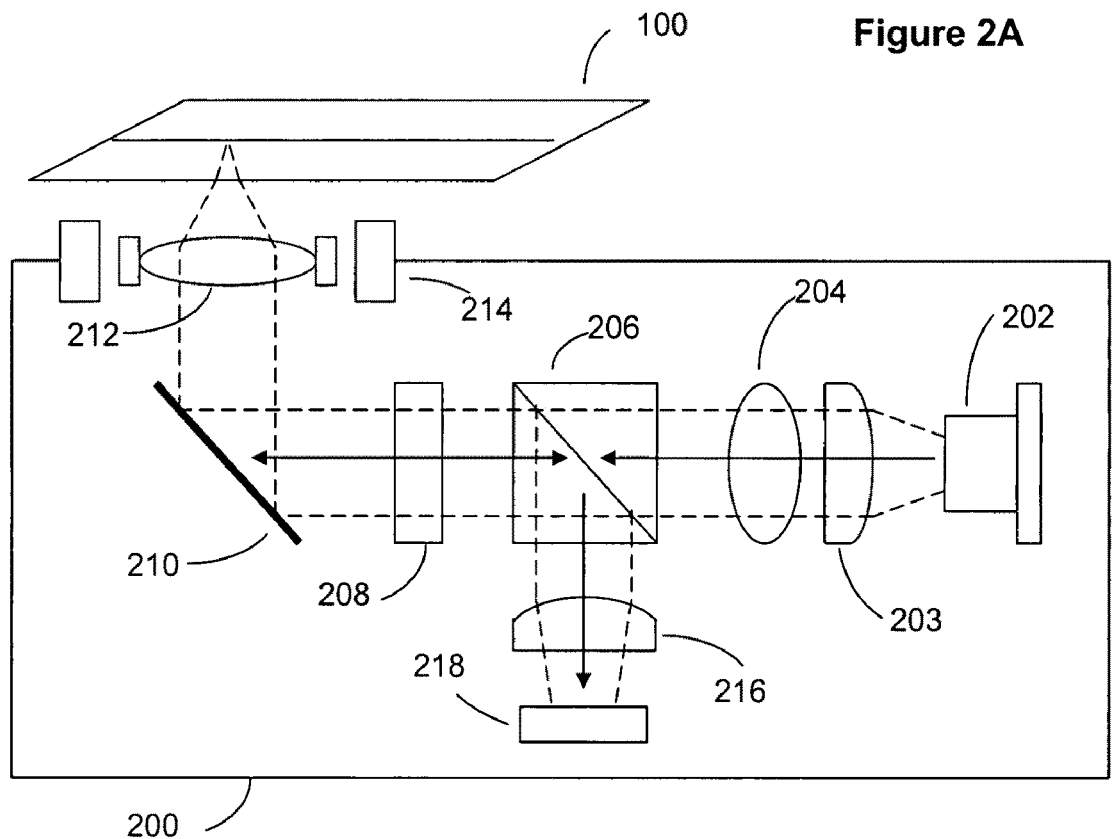
FIGS. 2A and 2B represent a schematic view of one embodiment of optics containing astigmatic focusing elements and example interface electronics for photo-detectors.

FIG. 2A is an example schematic illustration of an optical pickup unit (OPU) 200 that can be used in one embodiment for reading or writing optical media. The OPU 200 comprises a laser diode 202 for emitting coherent polarized energy, beam shaping optical elements, including a collimating lens 203 and beam shaping lens 204, a polarizing beam splitter 206, a quarter-wave plate 208, a mirror 210, an objective lens 212, electromechanical elements 214 coupled to the objective lens 212, a cylindrical lens 216, and four quadrant photo-detectors 218.

In operation of one embodiment, laser light is emitted from the laser diode 202 and can be made more circular by the beam shaping lens 204. Also, the laser light can be collimated using the collimating lens 203 so as to maintain the maximum amount of energy at the disc. The coherent light is linearly polarized and the polarization is oriented so as to lose little or no energy when passing through the polarizing beam splitter 206.

The polarization orientation is accomplished during the manufacture of the OPU 200 by having the laser diode 202 rotated to a suitable angle. The light then passes through a quarter-wave plate 208, which converts the light from being linearly polarized to circularly polarized. The light beam is then reflected through a mirror 210 through the objective lens 212, which focuses the mostly collimated beam to the recording layer of the optical disc. The laser light that is reflected back from the optical media is still circularly polarized.

However, in the opposite direction, the laser light is collected through the objective lens 212, reflected by the mirror 210, and converted back to linearly polarization by the quarter-wave plate 208. The polarization of the light is now rotated by 90 degrees so that the light is reflected by the polarizing beam splitter 206 to pass through the cylindrical lens 216 and onto the four quadrant photo-detectors 218, where the light intensity is converted to electrical signals. The cylindrical lens causes the light to converge along one axis faster than light along the other axis. The electromechanical elements 214 receive electrical signals causing the objective lens to move axially to maintain focus. The objective lens also moves radially to allow the focused spot to move across the tracks or to maintain radial tracking.

Figure 2B:
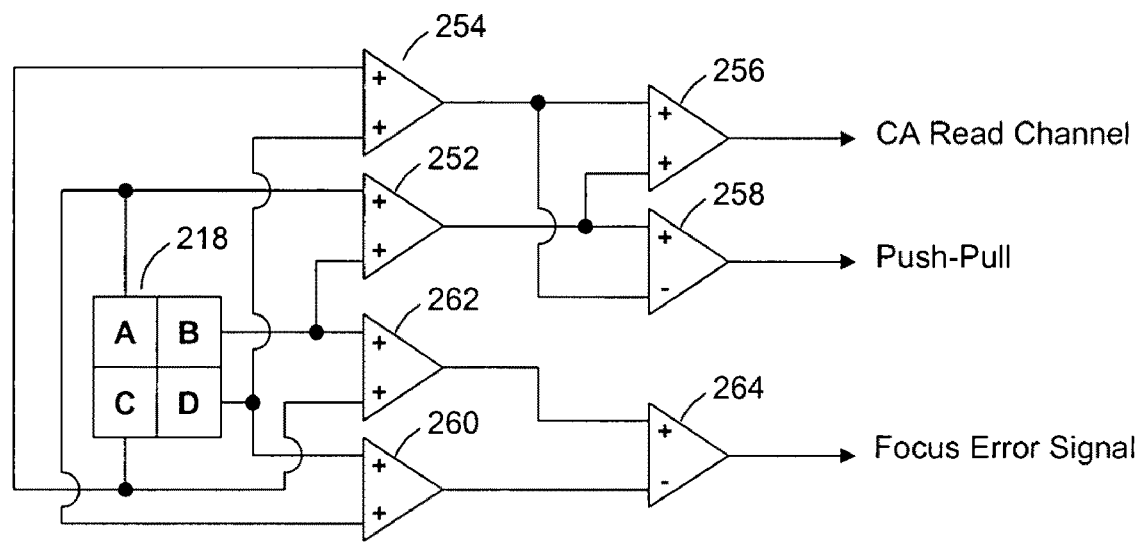

FIG. 2B illustrates the various read signals of one embodiment that can be derived from the four quadrant photo-detector 218, which consists of four individual detectors A, B, C, and D. The electrical signals from quadrants A and B, $I_A$ and $I_B$, are combined in summing amplifier 252. The signals from quadrants C and D, $I_C$ and $I_D$, are combined in summing amplifier 254. The outputs of the summing amplifiers 252 and 254 are then combined together in summing amplifier 256 and difference amplifier 258 to create the central aperture data read (CA) signal and the push-pull (PP) signal respectively. The signals $I_A$ and $I_D$ are also combined together in summing amplifier 260, while the signals $I_B$ and $I_C$ are combined in summing amplifier 262.

Next, the outputs of summing amplifiers 260 and 262 are combined in a difference amplifier to create a signal suitable for the focus error signal (FES) according to later signal conditioning. A strong push-pull signal is important for recordable drives because it helps maintain tracking while writing. In contrast, for certain copy protected removable storage medium, once the media has been recorded, a weak push pull signal is preferred so it can be read by another drive that uses laser optics with a different wavelength, such as drive 150 of FIG. 1.

In one embodiment, the CA read signal is used to read the data and to normalize the push-pull signal or other signals derived from the photo-detectors. It should be noted that other embodiments with varying designs and component orientations, including multiple objective lenses, are within the scope of the present invention.

Figure 3:
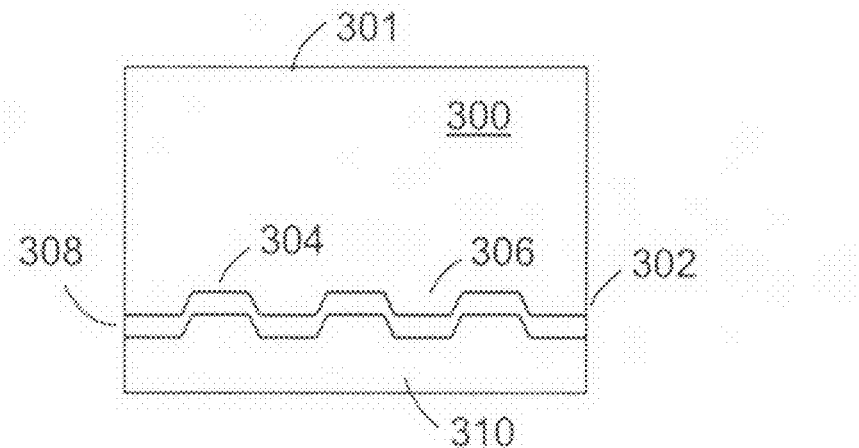
FIG. 3 shows an example of optical storage medium of one embodiment containing a spiral groove structure for recording.

FIG. 3 depicts a schematic layout of a cross section of one embodiment of the storage medium disc 100 of FIG. 1. The disc 100 includes a cover layer 300 with an entrance surface 301 and a land and groove structure 302 containing grooves 304 located closest to the entrance surface 301 separated by lands 306. An appropriate grove structure 302 is created so that a strong push-pull signal exists during writing of disc 100 of FIG. 1, while a weak push-pull signal exists when the disc is read by another drive that has a different laser wavelength than drive 126, such as drive 150 of FIG. 1. The groove 304 is oriented in a spiral fashion over all or part of the radius of the disc. A recording layer stack 308 exists on the land and groove structure 302. The recording layer stack can consist of multiple layers that allow recording or rewriting and reflecting different amounts of light depending on the presence of a recorded mark or a space.

Figure 4A:
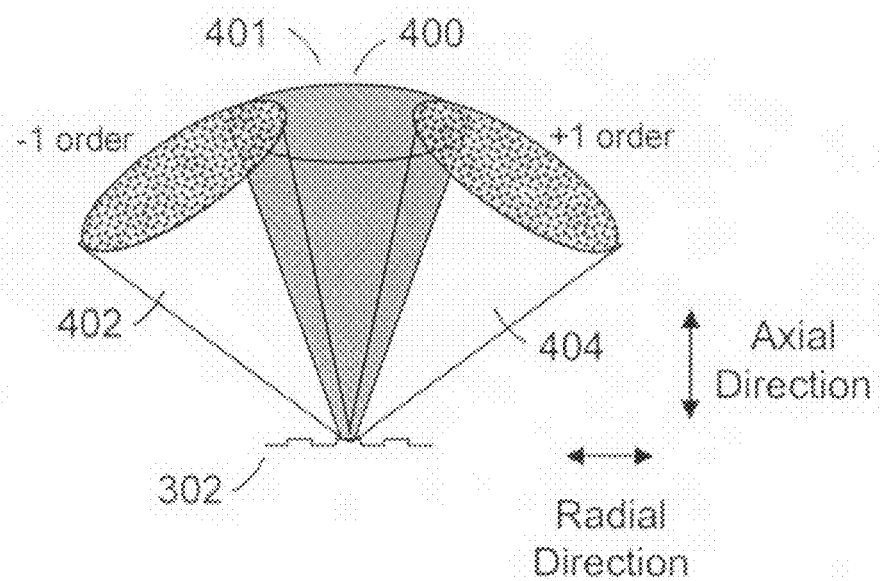
FIGS. 4A, 4B, 4C and 4D illustrate one embodiment of the grooved structure with the reflected light and the light intensity caused by the reflected light at the drive mechanism's photo-detectors.

FIGS. 4A, 4B, 4C and 4D are various diagrams depicting the grooved structure with the reflected light and the light intensity caused by the reflected light at the drive mechanism's photo-detectors of one embodiment. Referring to FIG. 4A, when focused optical light 400 from objective lens 212 of FIG. 2 is reflected by the groove structure 302 of FIG. 3, diffraction also occurs creating additional multiple lobes or orders of reflected light 402 (−1 order) and 404 (+1 order). The reflected light by this diffraction is in addition to the main reflected lobe 401. Additional orders are also reflected, but are not typically captured by the objective lens 212 of FIG. 2.

Figure 4B:
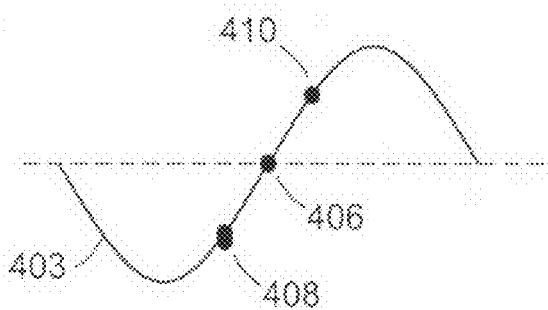

Incident at the four quadrant photo-detector 218 of FIG. 2, the +1 and −1 order reflected lobes (404 and 402) of FIG. 4A constructively or destructively interfere with the main reflected lobe 401 dependent on the amount and phase of the coherent light of the +1 and −1 order lobes, with respect to the amount and phase of the coherent light of the main reflected lobe 401. The intensity of the light on the photo-detectors 218 of FIG. 2 of the in-track case 406 of FIG. 4B will result in the +1 and −1 order phases of lobes 404 and 402 to equally impact the main lobe. The resulting signal 403 from the photo-detectors 218 of FIG. 2 are shown in FIG. 4B as the spot moves from on land to an adjacent land with the center of the track being the groove.

Figure 4C:
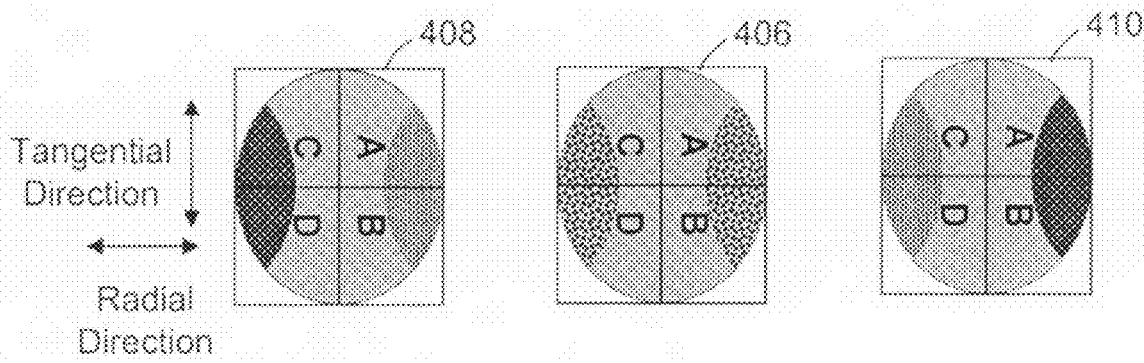

Referring to FIG. 4C, which shows a top view of FIG. 4A with the four quadrants, for the off-track cases 408 and 410, the +1 and −1 orders for lobes 404 and 402 have different phases with respect to each other according to the amount and direction of being off-track. The amount of phase difference between the main reflected signal 401 and the +1 and −1 order lobes 404 and 402 incident on the detector 218 of FIG. 2 is determined by an embodiment of the groove geometry 302 of FIG. 3 that has a strong push pull signal for a first wavelength and a weak push-pull signal for a second wavelength. Thus, the disc 100 of FIG. 1 that was written with a strong push-pull signal with the first wavelength also exhibits a weak push-pull signal when scanned by another drive 150 of FIG. 1 that uses a second wavelength. In one embodiment, a weak push-pull signal is a signal less than 15% of a predetermined amount and a strong push-pull signal is a signal greater than 20% of the predetermined amount before recording. The push-pull signal may exceed these percentages after recording.

Figure 4D:
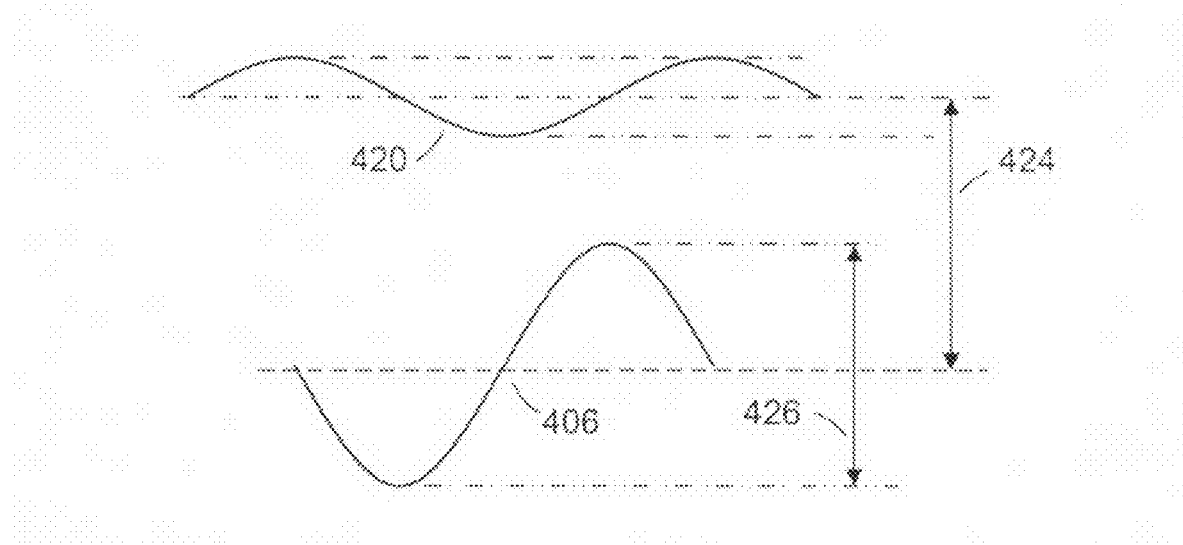

FIG. 4D illustrates the signals caused by the reflected light from the track in one embodiment. Values used for specifying the push-pull amplitude are calculated as a percentage of the push-pull amplitude 426 to the average total signal 424 or simply 426/424. The average total signal amplitude 424 is the average of signal 420 generated by summing all four quadrants of the photo-detector. The average signal 424 is $$[(I_A+I_B+I_C+I_D)_{MIN}+(I_A+I_B+I_C+I_D)_{MAX}]/2.$$

The amplitude 426 from the push-pull signal 406 from the Push-Pull value is calculated as:

$$PP = \frac{[(I_A+I_B)-(I_C+I_D)]_{MAX} - [(I_A+I_B)-(I_C+I_D)]_{MIN}}{[(I_A+I_B+I_C+I_D)_{MIN} + (I_A+I_B+I_C+I_D)_{MAX}]/2}$$

FIG. 5 illustrates the push-pull signals of one embodiment as the objective lens 212 radially scans across grooves 304. Referring to FIG. 3 along with FIG. 5, the radial scan occurs for two different wavelength laser diodes on land and groove structures 302 that were optimized for the two different wavelengths. The groove depth is optimized based on the wavelength of the laser diode used for reading and writing. For example, a groove structure optimized for a longer wavelength laser diode will be deeper than a groove optimized for a shorter wavelength diode. The long wavelength groove depth 502 has a strong push-pull signal 504 when scanned with the first or long wavelength laser diode. One embodiment of the invention utilizes a groove structure with a shallow depth 510 in the land and groove structure 302 of that produces a weak push-pull signal 512 when using a first range of longer wavelengths laser diodes and a strong push-pull signal 514 when using a second range of shorter wavelength diodes.

Figure 6:
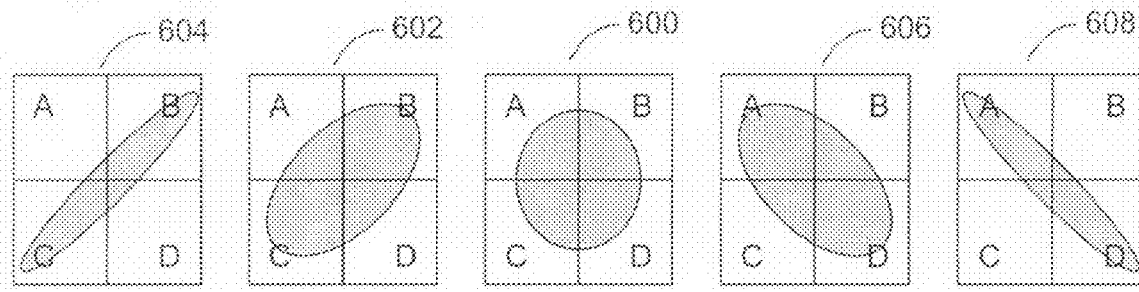
FIG. 6 illustrates the light intensity incident of one embodiment on the drive mechanism's photo-detectors caused by a cylindrical lens.

FIG. 6 illustrates the effect, shown with outlines, of the cylindrical astigmatic lens of one embodiment as the objective lens moves with respect to the optical disc. When in focus, the light spot on the photo-detectors 218 of FIG. 2 is roughly circular in shape 600. As the objective lens moves away from the disc, the light spot becomes increasingly elliptical (diagonally across the four quadrant photo-detector 218) in shape 602 and then 604. Similarly, as the objective lens moves closer to the disc, the light spot becomes more 606 and more 608 elliptical, but rotated by 90 degrees with respect to the objective lens too far from the disc case. When recording at a predetermined focus offset, the light spot on the photo-detectors 218 will be elliptical, similar to 602 and 606.

Figure 7:
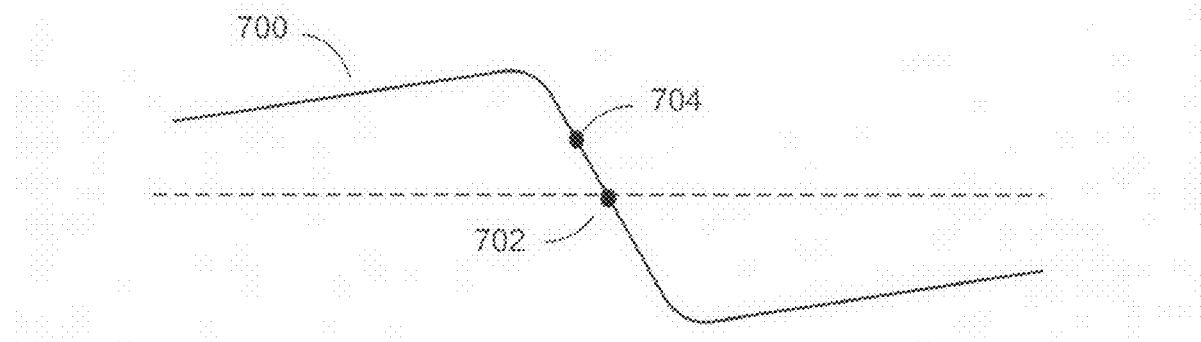
FIG. 7 illustrates the focus error signal of one embodiment as the lens moves through the optimal focus.

FIG. 7 represents focus error signal (FES) 700 of one embodiment generated as the lens moves through the range of focus for the recording layer of the optical disc. The nominal focus point 702 exists at the zero crossing of the FES. However, the predetermined optimal offset focus point 704 of this embodiment is used as a set point for use by servo processing 112 of FIG. 1 to maintain focus while reading or writing.

FIG. 8 illustrates two different examples of recorded marks with two different radial widths and the modulated signal from the two examples of one embodiment. The series of marks with narrow radial marks 800 and the eye pattern signal 802 from the central aperture (CA) read channel signal. When compared to the series of wider marks 804 and its eye pattern signal 806, the narrow marks will result in modulation that is low. Read-only drives expect modulation to remain above a specified level, or read errors will increase. Additionally, the shortest marks and spaces become more difficult to distinguish from noise and accurate detection becomes more difficult. The defocus spot of this embodiment enables recording larger marks 804 using a shorter wavelength that are similar in size to marks recorded using a longer wavelength.

FIG. 9 shows one embodiment of the impact of defocus on the spot size at the recording layer. The ray tracing of the focusing beam 920 illustrates the spot sizes of the focused spot 900 and the larger defocused spot 910 in one embodiment. The spot size is generally considered to be the full-width-half maximum (FWHM) of the aberration-free intensity 930 profile. Because defocusing the spot will introduce some aberrations to the spot intensity profile, an optimal defocus amount is chosen to limit the aberrations to allow sufficient recordings.

Figure 10A:
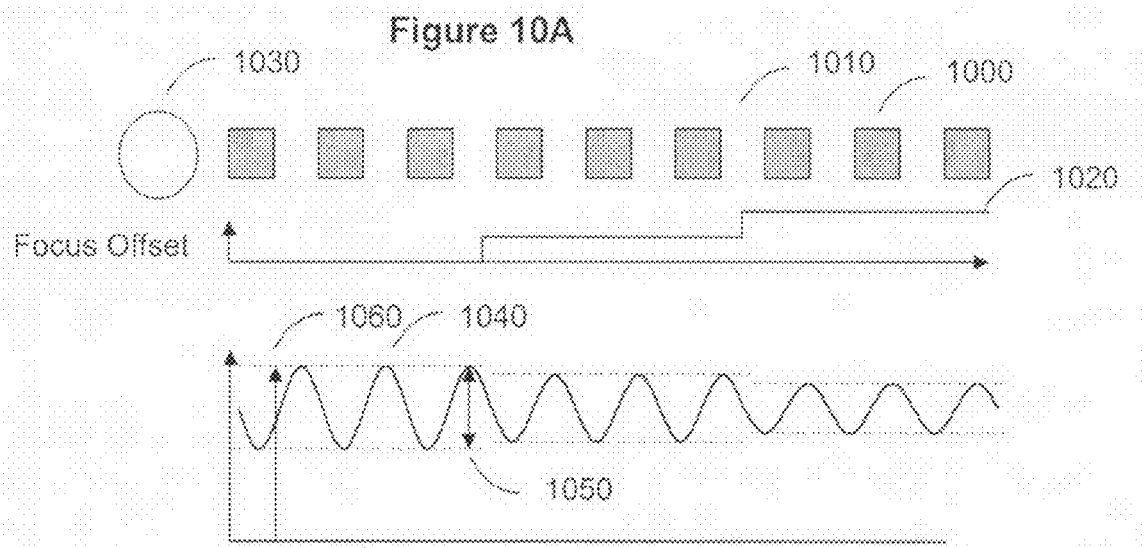
FIGS. 10A to 10J illustrate various structures or marks on the optical medium and their resulting signals of one embodiment that facilitate determining an optimal focal offset.

FIGS. 10A through 10J represent one embodiment with recorded marks or embossed features 1000 and spaces 1010 on the media for use by a recording device to determine the optimal focal offset point 704 of FIG. 7. In FIG. 10A, as the laser spot 1030 created by a optical drive scans across the series of marks 1000 and that are of the same size and spacing 1010, a signal 1040 is created from the summing the four quadrants of the photo-detector with a peak-to-peak amplitude 1050 and a zero-to-peak amplitude 1060. The amplitudes 1050 and 1060 change as the amount of defocus increases. The series of marks and spaces can be continually scanned using different focal offsets to find the optimal desired focal offset point 704 or the focus offset 1020 can be changed as the spot scans a long stream of marks.

Figure 10B:
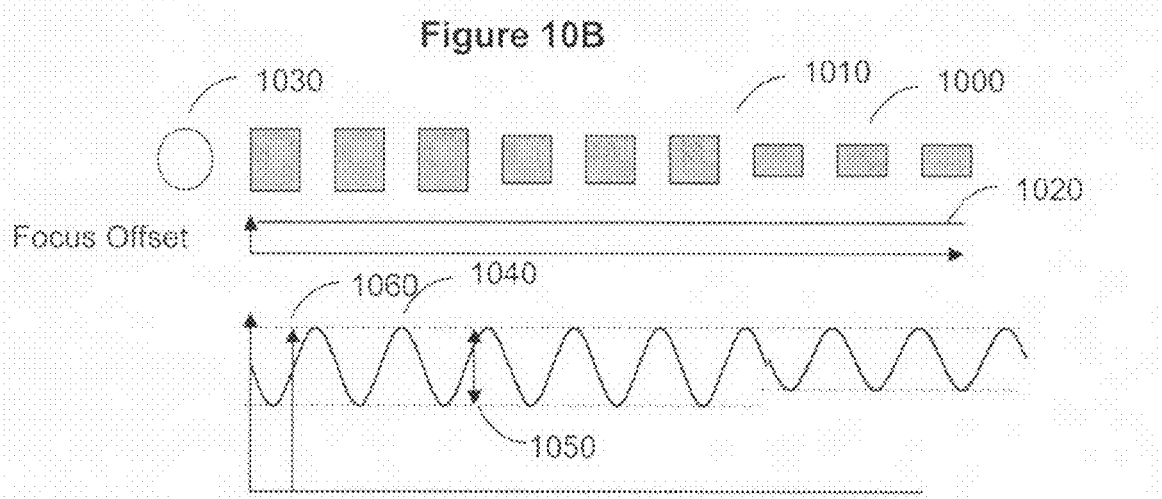

In FIG. 10B, the mark 1000 sizes at the same spacing are periodically reduced in size radially. As the laser spot scans across the marks and spaces, the signal amplitudes 1060 and 1050 will change at the point in which the marks change in radial size. The focus offset 1020 is not changed as the laser spot scans across a series of changing mark sizes. Multiple scans using different focal offsets will result in different amplitude changes as the spot size increases in size due to defocus. Also, the changing mark radial widths provide information since the signal amplitude will change appropriately as the spot size with the optimal focus offset will have a specified signal on marks with specific widths in the stream of marks.

Figure 10C:
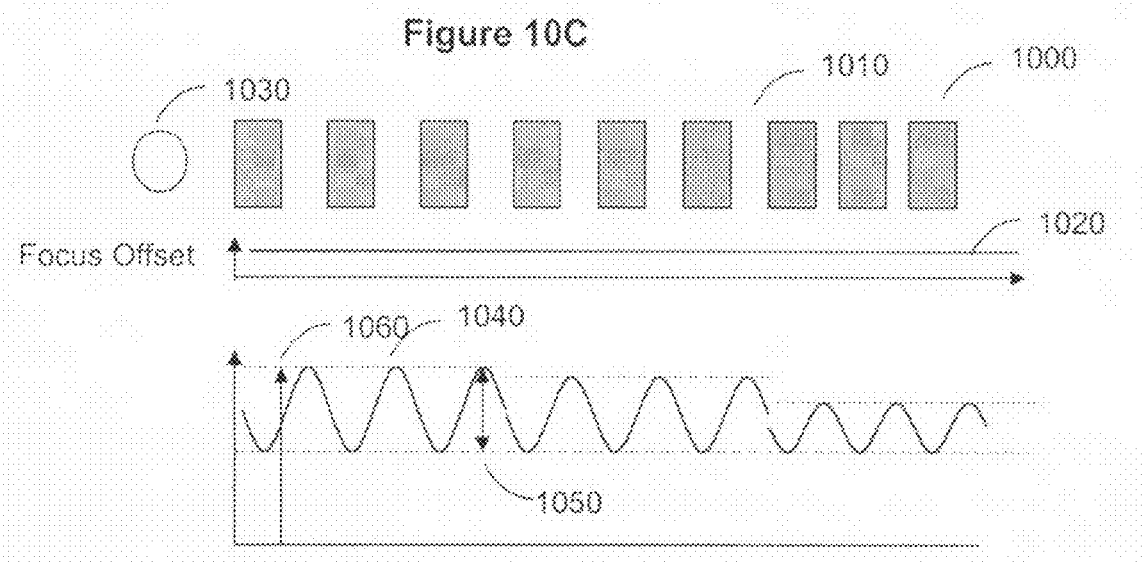
Figure 10D:
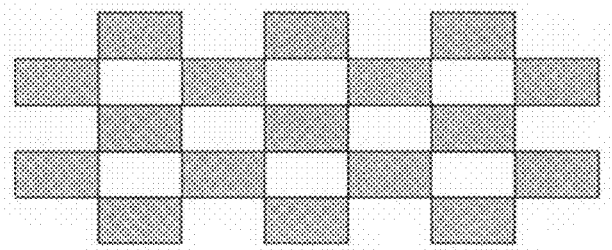
Figure 10E:
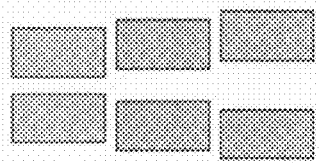
Figure 10F:
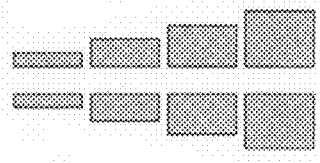
Figure 10G:
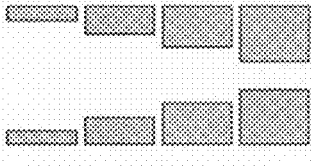

In FIG. 10C, the marks 1000 are of equal size, but the spacing 1010 between the marks changes periodically. As the laser spot 1030 scans across the marks and spaces, the signal amplitudes 1050 and 1060 generated will change as the spacing changes. The focus offset 1020 is not changed as the laser spot scans across a series of changing mark spacings. The marks 1000 can be sufficiently large in the radial direction so that the amplitudes change at a different rate as the spot size becomes larger than the spacing. Multiple scans using different focal offsets will result in different amplitude changes as the spot size increases in size due to defocus. Also, the changing mark spacings provide information since the signal amplitude will change appropriately as the spot size with the optimal focus offset will have a specified signal on marks with a specific spacing the stream of marks. Additional marks and spacings that represent combinations of any of the various aspects of the marks and spaces are possible.

Figure 10H:
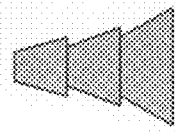
Figure 10I:
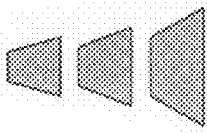
Figure 10J:
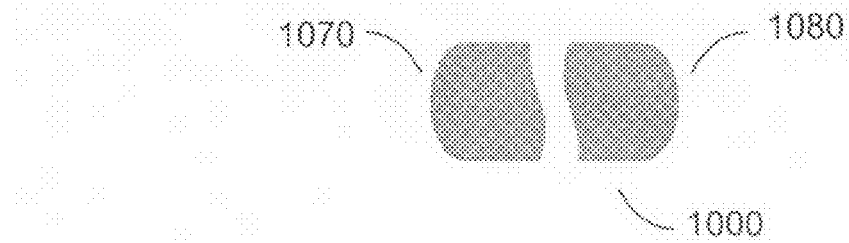

FIGS. 10A through 10C represent embodiments of individual marks in a series of marks that maintain the same radial thickness across the individual mark. FIGS. 10D through 10G represent focus marks that include multiple marks in the radial direction, as shown by the coordinate system in FIGS. 4A, 4C and FIG. 5. These marks allow discrimination of spot sizes in the radial direction and the tangential direction. The marks in FIGS. 10H and 10I represent another embodiment where the radial thickness changes across each individual mark. The representations of the marks are illustrated as rectangular shaped marks. In one embodiment as shown in FIG. 10J, in practice, the leading 1070 and trailing 1080 edges of the marks are elliptical in shape due to the spot shape of the laser spot of a writing drive or laser beam mastering equipment. In one embodiment, the disc can have pre-recorded or stamped indicia, such recorded marks or stamped or embossed marks, used for determining the optimal focal offset. Other implementations of the marks are possible using these various aspects or combinations of the marks described.

Figure 11:
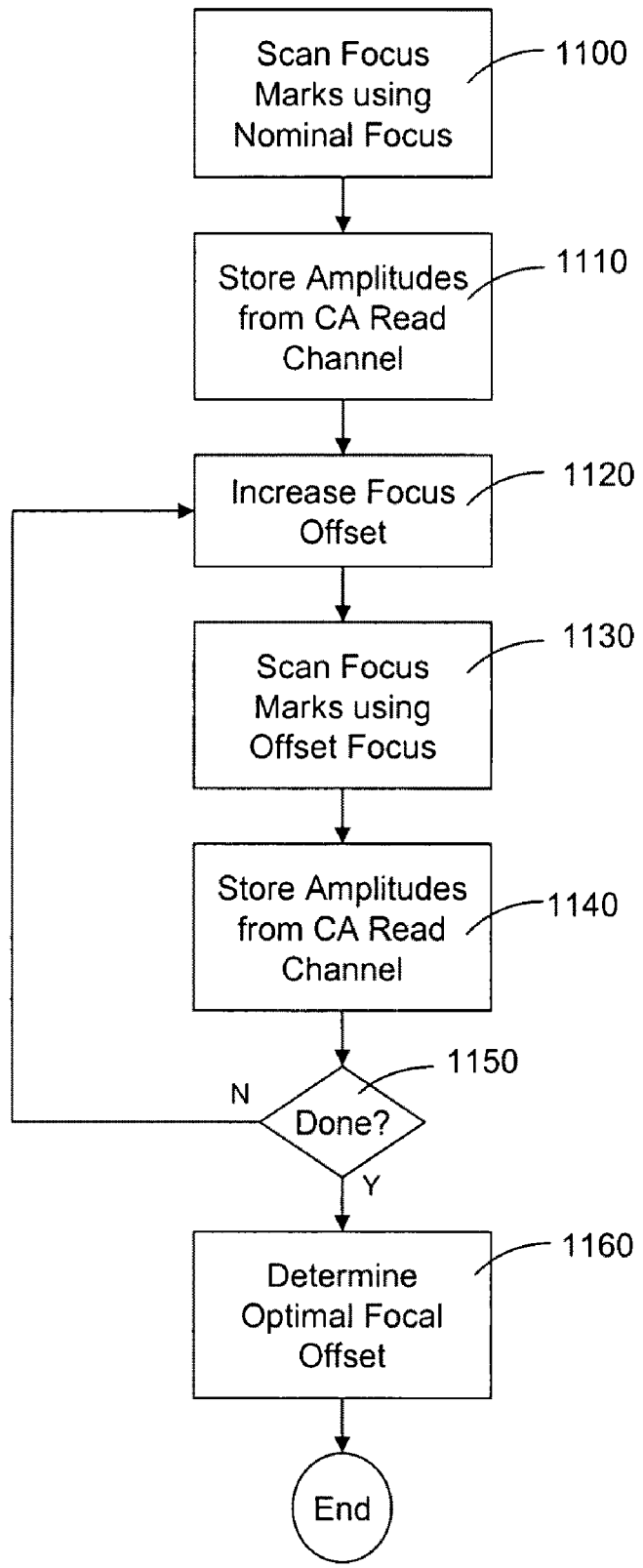
FIG. 11 illustrates an example flow chart of one embodiment for determining an optimal focal offset using structures or marks on the optical medium.

The flow chart in FIG. 11 illustrates an example method for determining the optimal offset focus in one embodiment. In step 1100, the focus marks are scanned using the nominal focus point 702 of FIG. 7. In step 1110, the amplitudes from the CA read channel are stored for later evaluation in step 1160. In step 1120, a focus offset is increased in a predetermined direction. In steps 1130 and 1140 the marks are scanned with the new focus offset and stored for later evaluation in step 1160. Step 1150 determines if the complete range of focus offsets has been used or the results of the previous scan cross a predetermined threshold. If not done, then execution of steps 1120 through 1140 is repeated with a larger focus offset amount. If completed, then in step 1160 a curve fit or linear interpolation or extrapolation is used to find the optimal focus offset 704.

Figure 12A:
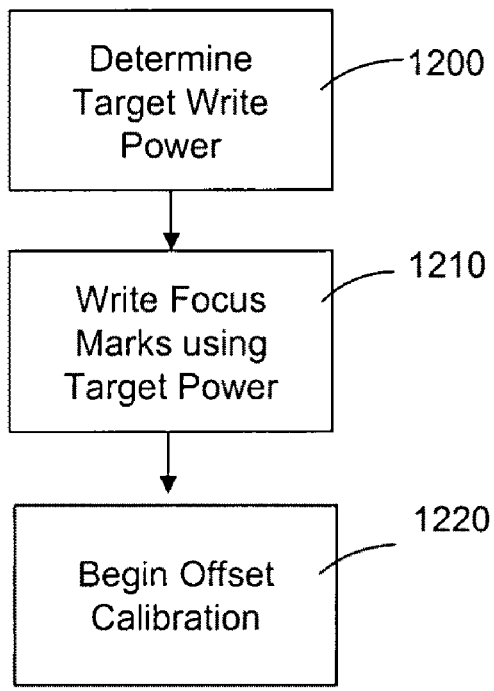
FIGS. 12A and 12B illustrate example flow charts of embodiments for determining an optimal focal by first recording marks on the optical medium.
Figure 12B:
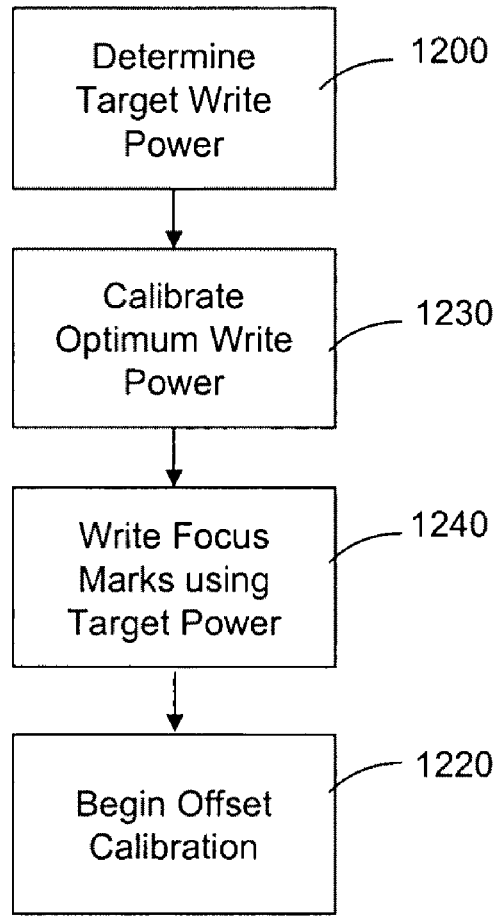

FIGS. 12A and 12B are flow charts for two examples for recording the marks in one embodiment. In this embodiment, the focus marks were not prerecorded or embossed at the disc factory and are created by the recording drive. In FIG. 12A step 1200, the recording mechanism or drive reads the target write power from the disc or the target write power is passed to the mechanism through a software interface. The target power can be explicit power values or an index for which the explicit power values can be retrieved. In step 1210, the recording mechanism writes focus marks at a predetermined location. The next step 1220 is to begin the offset point calibration, such as in FIG. 11. Using predetermined values may not result in the optimum focus mark geometry due to various factors including differences in optics, electronics, recording characteristics, temperatures, and other characteristics between drives and media and the recording environment. The groove geometry can also be designed to help constrain the width of the recorded focus marks.

It is also possible to record the focus marks using a recording power that is optimized preceding the recording of the focus marks. In FIG. 12B, the recording mechanism still receives the target write powers in step 1200 as in FIG. 12A. However, in step 1230, the recording mechanism records marks with various power levels without any defocus that are relatively close to the target power and then calibrates the optimum power for recording the marks. In step 1240, the recording mechanism records the focus marks using the optimized write powers or write powers directly related to the optimized write powers without any defocus. The recording mechanism then uses an algorithm, such as in FIG. 11, to determine the optimal focus offset point.

The foregoing has described the principles, embodiments and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims. For example, the teachings provided herein are applicable to computer systems as well as stand-alone storage devices such as optical disc video recorders.

What is claimed is:

1. A method for storing computer readable data on a removable storage medium, comprising:

using a first wavelength to write data to the removable storage medium; and creating marks while writing the data, wherein the marks have predetermined wide spot sizes to allow the marks to be read with a second wavelength, different from the first wavelength, of another computer readable storage device;

wherein the medium provides a push-pull signal amplitude greater than 20% of the average amplitude of signal detected for the first wavelength reflected from the medium; and provides a push-pull signal amplitude less than 15% of the average amplitude of signal detected for the second wavelength reflected from the medium.

2. The method of claim 1, further comprising selectively defocusing a recording lens using the first wavelength for enlarging the spot size.

3. The method of claim 1, further comprising determining a fixed focal offset for the first wavelength by determining a calibrated value.

4. The method of claim 1, further comprising determining a fixed focal offset for the first wavelength during manufacturing of a drive using the first wavelength.

5. The method of claim 1, further comprising determining a fixed focal offset for the first wavelength immediately prior to writing the data.

6. The method of claim 1, further comprising reading a target write power value from the removable storage medium, writing focus marks at a predetermined location, calibrating offset points and using groove geometry to constrain a width of recorded focus marks.

7. The method of claim 3, further comprising determining the fixed focal offset for individual removable storage medium by writing the data at varying offsets and sending test signals to the removable storage medium.

8. The method of claim 7, further comprising recording focus marks using a recording power that is optimized before recording the focus marks, wherein the focus marks are recorded with various power levels for determining optimum power for recording the focus marks.

9. The method of claim 7, wherein the test signals from reading are generated by one of the second wavelength or first wavelength to determine the optimum offset.

10. The method of claim 7, further comprising using one of pre-recorded or stamped indicia on the removable storage medium to determine the optimal focal offset.

11. A recording device for storing computer readable data on a removable with storage medium, comprising:
    laser optics with a first wavelength for creating a spot size configured to generate marks and spaces in the removable storage medium; and
    a defocusing device configured to enlarge the spot size to within an optimal focal offset range, wherein the marks and spaces are capable of being read by disc reading devices that use laser optics with a second wavelength, which is different from the first wavelength; and
    a detector and circuitry configured to generate a push-pull signal amplitude greater than 20% of the average amplitude of signal detected by the detector as the first wavelength reflected from the medium;
    wherein the medium is configured to provide a push-pull signal amplitude less than 15% of the average amplitude of signal detected for the second wavelength reflected from the medium.

12. The recording device of claim 11, wherein laser optics for the first wavelength uses a blue-violet laser that has a wavelength of one of 400 to 420 nanometers.

13. The recording device of claim 11, wherein laser optics for the second wavelength uses a red laser that has a wavelength of one of from 645 to 670 nanometers.

14. The recording device of claim 11, wherein the laser optics of the first wavelength creates marks and spaces comparable to marks and spaces written by a red laser.

15. The recording device of claim 11, wherein the medium creates a predetermined weak push-pull signal when read by a red laser, and creates a predetermined strong push-pull signal when read by a blue-violet laser.

16. The recording device of claim 11, further comprising a spiral groove structure located over at least part of the removable storage medium.

17. A recordable device for storing computer readable data on a removable storage medium, comprising:
    an objective lens;
    a laser diode coupled to the objective lens and operating at a first wavelength, wherein the laser diode is configured to create marks on the removable storage medium;
    a detector coupled to the laser diode and capable of distinguishing different foci; and
    an offset processor configured to determine a desired focal offset, wherein the marks created by the laser diode are capable of being read by disc reading devices that use laser optics with a second wavelength, which is different from the first wavelength;
    wherein the detector generates a push-pull signal amplitude greater than 20% of the average amplitude of signal detected by the detector as the first wavelength reflected from the medium;
    wherein the medium is configured to provide a push-pull signal amplitude less than 15% of the average amplitude of signal detected for the second wavelength reflected from the medium.

18. The recordable device of claim 17, wherein the laser optics of the first wavelength creates marks comparable to marks written by a red laser.

19. The recordable device of claim 17, wherein the offset processor includes a defocusing processor configured to enlarge the spot size to within an optimal focal offset range.

20. The recordable device of claim 17, wherein the second wavelength uses a red laser that has a wavelength of one of from 645 to 670 nanometers.

21. The recordable device of claim 17, wherein the laser diode for the first wavelength uses a blue-violet laser that has a wavelength of one of from 400 to 420 nanometers.

22. The recordable device of claim 17, wherein the medium creates a predetermined weak push-pull signal when read by a red laser, and creates a predetermined strong push-pull signal when read by a blue-violet laser.

23. A removable recordable optical media for storing computer readable data, comprising:
    a disc shaped structure; and
    a spiral groove structure over at least part of the radius of the disc shaped structure;
    wherein the groove structure having a groove depth that will cause a strong push-pull signal from a first wavelength and a weak push-pull signal from a second wavelength; and
    wherein the strong push-pull signal amplitude is greater than 20% of the average amplitude of signal detected as light reflected from the groove structure and the weak push-pull signal is less than 15% of the average amplitude of signal detected as light reflected from the groove structure.

24. The removable recordable optical media of claim 23, wherein the first wavelength is one of from 400 nm to 420 nm.

25. The removable recordable optical media of claim 23, wherein the second wavelength is one of from 645 nm to 670 nm.

26. The removable recordable optical media of claim 23, wherein the first wavelength includes a blue-violet laser beam and the second wavelength includes a red laser beam.

* * * * *

UNITED STATES PATENT AND TRADEMARK OFFICE
CERTIFICATE OF CORRECTION

| | | |
|---|---|---|
| PATENT NO. | : 7,804,752 B2 | Page 1 of 1 |
| APPLICATION NO. | : 11/702265 | |
| DATED | : September 28, 2010 | |
| INVENTOR(S) | : Charles R. Weirauch | |

It is certified that error appears in the above-identified patent and that said Letters Patent is hereby corrected as shown below:

In column 9, line 31, in Claim 11, after "removable" delete "with".

Signed and Sealed this
Eighth Day of March, 2011

David J. Kappos
*Director of the United States Patent and Trademark Office*